Patented Aug. 9, 1938

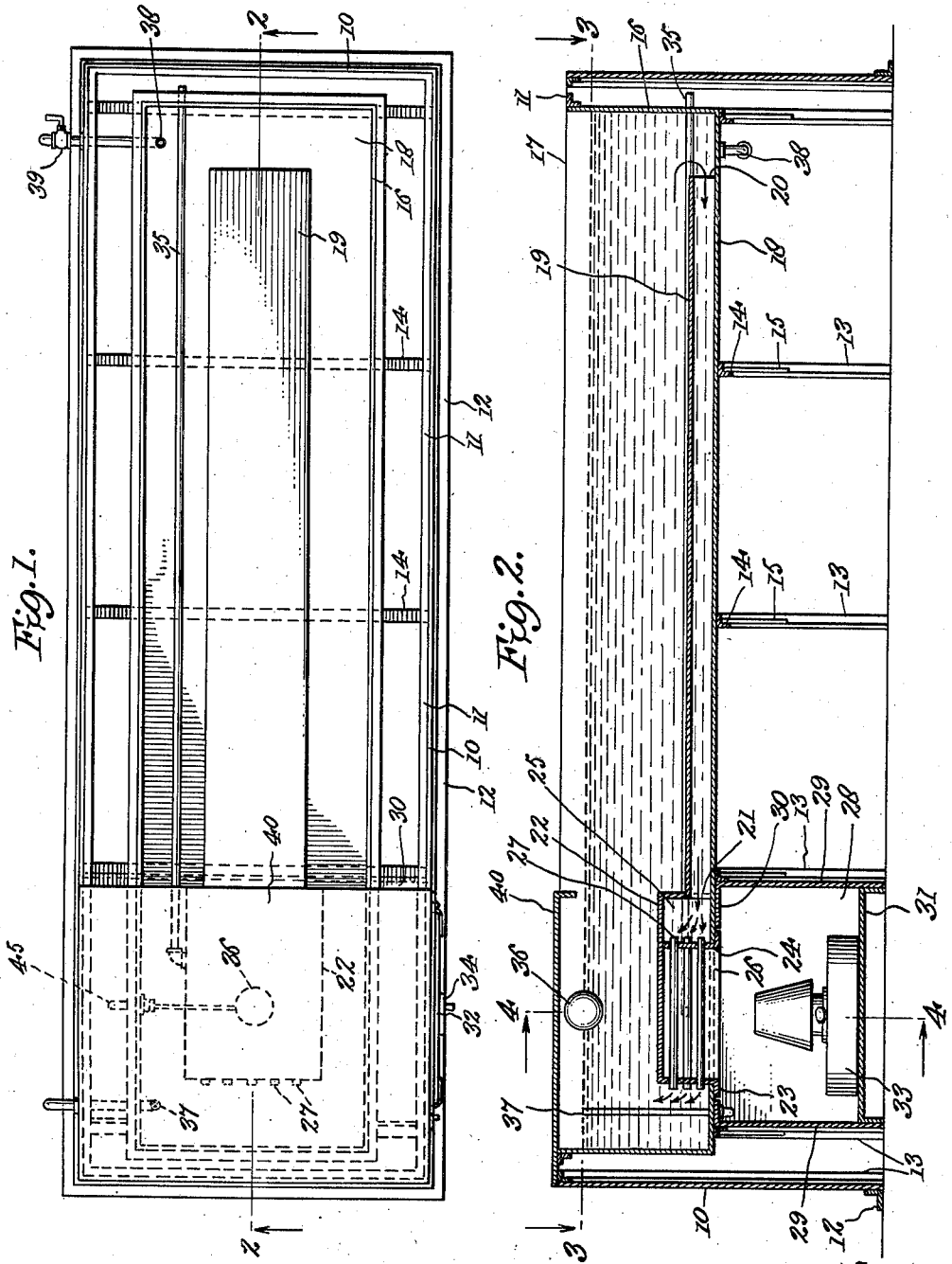

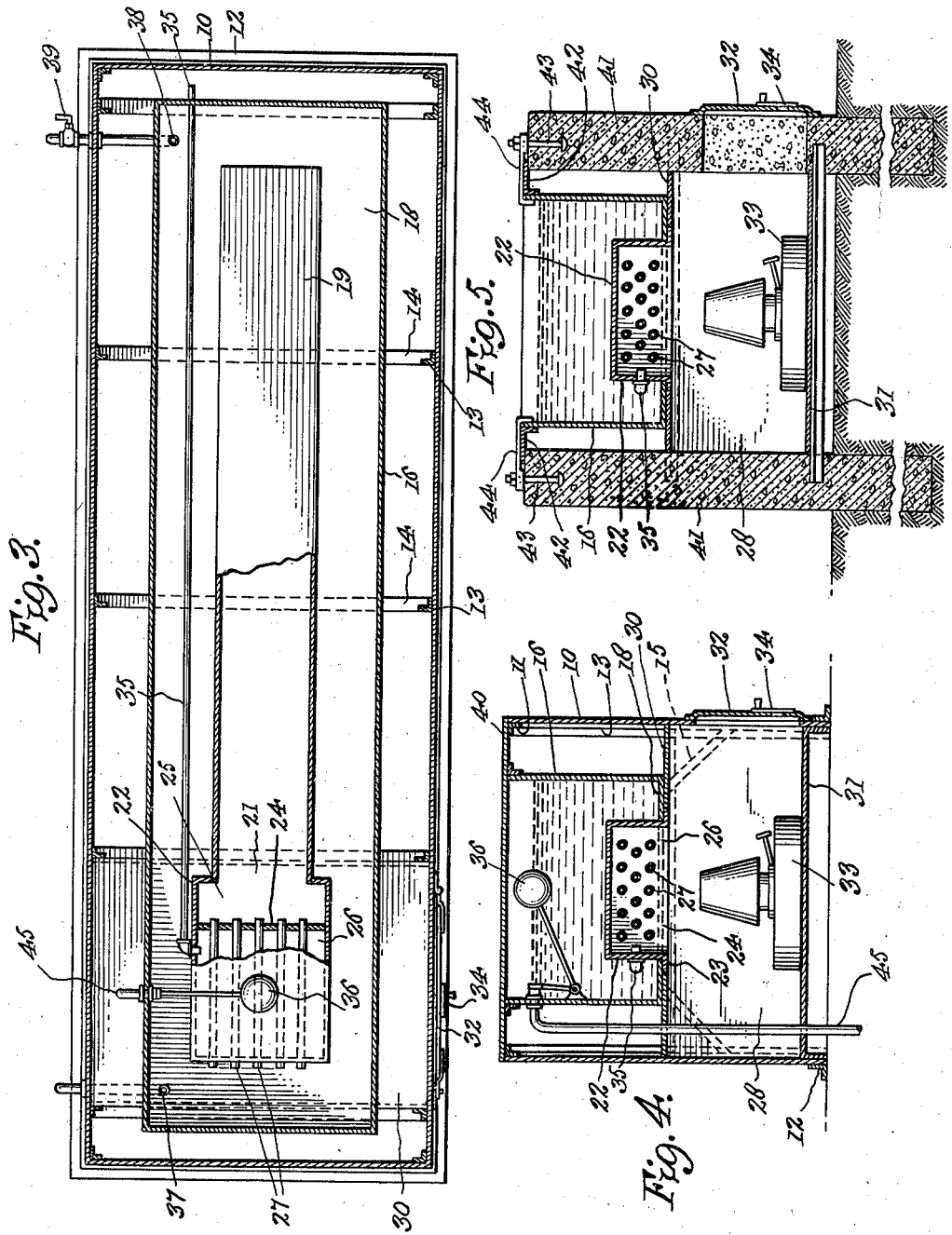

2,126,657

UNITED STATES PATENT OFFICE 2,126,657

HEATED TANK FOR LIVESTOCK

Leslie T. Petersen, Denison, Iowa

Application October 9, 1936, Serial No. 104,885

6 Claims. (Cl. 126—344)

The present invention relates to a new and novel construction of heated water tanks especially adapted for outdoor use during cold weather, and has for an object to provide means for continuously assuring cattle or other livestock, which have access thereto, of a proper supply of drinking water.

Another object of the invention is to provide a water heating tank structure wherein the tank may be in substantially the usual form of trough or open top container, and wherein the heating features occupy but little space within and about the tank; the structure being relatively compact and affording the usual easy access to the water by the livestock.

Another object of the invention is to provide a tank of this type in which is mounted a container to receive a limited supply of water having an elongated guideway along its bottom surface for directing the passage of the water therethrough, and with a heating medium placed adjacent the outlet of the guideway to heat the water after passing through the guideway and to form a means for circulating the water within the container.

A further object of this invention is to provide a container with an upturned base portion or dome adjacent one end thereof to house a plurality of pipes through which the water from the guideway is passed, and likewise provides a top for the enclosed compartment formed in the casing below the container where the flames from a removable heating unit are directed upwardly into the dome to contact with the pipes and to heat the water therein.

Another object of this type of tank resides in providing an exhaust pipe between the dome and beyond the outer end of the container to be placed adjacent the bottom of the container to serve in utilizing the excess heat from the burner in assisting to heat the water.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a plan view of the heating tank.

Figure 2 is a longitudinal section view taken along the line 2—2 of Figure 1.

Figure 3 is a horizontal section view partly broken away taken along the line 3—3 of Figure 2.

Figure 4 is transverse section view taken along the line 4—4 of Figure 2, and

Figure 5 is a transverse section view of a slightly modified form of the heating tank.

Referring to the drawings, and more particularly to the form shown in Figures 1 to 4, the numeral 10 refers to the outer elongated casing which is preferably rectangular in shape, and has its end and side walls connected together along the upper edges by the horizontally extending strip or brace 11, and likewise along the lower edges by the strip or brace 12. The casing 10 has secured thereto in conveniently spaced relation the angle iron members 13 which extend vertically from the upper brace 11 to the lower edges of the side or end walls of the casing and provide means for supporting and holding the casing in an upright position upon the ground or surface where it is desired to locate the same.

These members 13 are similarly positioned along each of the side walls of the casing, and the ends of a horizontally projecting bar 14 is secured to each pair of oppositely disposed vertical members, and similarly placed in a position intermediate the top and the bottom of the same. Diagonally arranged strips 15 are fastened to the horizontal bars and vertical members to further assure these parts form a rigid frame.

An elongated and rectangular tank or container 16 having an open top 17 and a closed bottom 18 is supported within the casing upon the horizontal bars 14 at the desired level above the ground, and with its side and end walls placed in spaced relation to the walls of the casing. This assures that the tank 16 is advantageously placed in a position where the same will more readily endure the severe weather conditions to which the same may be subjected and without impairing or preventing the operation of the device. The tank 16 has a false bottom member or guideway 19 secured along the central lengthwise portion of the bottom 18 with one end 20 open and disposed a short distance from the end wall of the tank. The other end 21 of the guideway opens into one end of a heating chamber 22 of greater height and width than that of the channel 19 and which is closed at its bottom against the bottom of the tank 16 adjacent its opposite end. The chamber 22 projects upwardly through an opening formed in the bottom of the tank 16, and is flanged outwardly at its lower edge 23 to secure the chamber 22 to the bottom of the tank.

This chamber 22 has a transverse partition or plate 24 disposed in spaced relation to the inner end of the chamber as shown in Figure 2 for dividing the same into a closed compartment or head 25 and a flue chamber 26. The outer end 21 of the channel 19 directs the water from within the tank 16 into the compartment 25, and a plurality of tubes or pipes 27 are secured through and extend between the plate 24 and the outer end wall of the chamber 22 to carry the water in the tubes and through and across the flue chamber 26. Thus, the tank 16 has therein, at a suitable position, a heating or flue chamber 26 which opens downwardly through the bottom 18 and through which extend water tubes communicating at opposite ends with the interior of the tank 16 for circulating and heating the water in the tank. The guideway or channel 19 may extend as desired from the head 25, into which one end of the water tubes open, along the bottom 18 of the tank to promote a wide circulation of the water in the tank. The walls of the chamber 26 and the tubes 27 lie within the tank and are submerged in the water in the tank so that heat in the chamber 26 is transmitted through the walls thereof and the tubes 27 to the water to conserve heat radiation and maintain the water at the desired temperature with a minimum expenditure of fuel or other heat producing medium.

An enclosed compartment or combustion chamber 28 is formed below the chamber 26 of the tank, and has the side walls 29 extending transversely of the casing secured to the vertical braces 13, and with a top wall 30 seated against the bottom 18 of the tank and cut away to permit the upward insertion of the chamber 22. A suitable floor or bottom plate 31 is rigidly attached to the side walls 29. A hinged door 32 is mounted upon the casing between the side walls 29 of the lower compartment or chamber 28, and permits the ready insertion and removal of a heater 33, which is preferably a kerosene oil burner. The flame and heat from this burner are controlled by a damper 34 mounted upon the door 32, and are directed upwardly into the flue chamber 26 to contact with the tubes and the walls for heating the water passing therethrough and thereabout.

An elongated tube 35 is connected at one end to one side of the chamber 22 and extends in close proximity along the bottom of and within the tank 16 and through the end wall of the same. This tube 35 receives the excess heat from the chamber 26 and, while serving to exhaust the same, affords an additional means for heating the water along the bottom of the container.

A float valve 36 is mounted in the container as shown to automatically regulate the intake of water through a water feed pipe 45 which is connected with an outside source of water supply to maintain a desired surface level of the water in the tank 16.

An exhaust pipe 37 is attached to the bottom of the container 16 and projects upwardly into the same to the top of the normal water level and serves to carry off excess water above said level. A drain pipe 38 is likewise mounted in the bottom of the container and has a valve 39 connected thereto which may be hand operated for completely draining the container when it is desired to clean or repair the same.

A plate or cover 40 is fixedly mounted upon the top of the tank over the heating chamber 22 to protect the same and the adjacent parts in the tank. This plate 40 provides a means for guarding the float valve and heating unit, and also serves to prevent the entrance of foreign matter into the tank.

In the slightly modified type of tank 16 shown in Figure 5 of the drawings, the numeral 41 represents stationary concrete walls which form the outer casing or support. The tank or container 16 is mounted within this casing and provided along the upper edges of its side walls with the outwardly projecting flanges 42 which rest upon the top of the concrete walls, and form additional means for supporting the tank in the position shown. The concrete walls have the bolts 43 embedded therein, and adjustable fingers 44 are carried by the bolts to engage the upper and inner edges of the tank for holding the same properly spaced from the concrete walls.

In the operation of this water heater after the same has been located outdoors in the desired position, the water inlet pipe into the tank is connected with a source of water supply for supplying and feeding water continuously until the water in the tank reaches a predetermined level. The float valve 36 is mounted within the tank to automatically operate and cut off the flow of water from the inlet pipe when the proper amount of water in the tank is had. The overflow pipe 37 in the tank carries off any excess water, and further assures that the water in the tank is kept at the proper level. The water in the lower part of the tank will initially pass into the passageway or channel 19 and into the pipes 27. When the heating unit 33 is placed to operate in the enclosed compartment 28 the heat therefrom passes upwardly into the chamber 26 and into contact with the pipes 27 and the walls of the chamber 26. The water in these pipes 27 will be heated and will pass out of the pipes in the direction indicated by the arrows shown in Figure 2 and upwardly to the surface top of the water. The water in the guideway 19 which is the coolest in the tank replaces the heated water in the pipes and is similarly heated to pass therethrough. Thus the cold water in the tank is drawn towards one end of the tank to enter the opening 20 in the guideway along the bottom of the tank, and heated while passing through the tubes at the opposite end of the tank to cause the water to circulate within the tank and maintain the water at the required even temperature. A great part of the excess heat from the pipe 35 is expelled to advantageously heat the water adjacent the end of the tank where the pipes 27 are mounted and to give the water added momentum. The other part of the excess heat passing through the pipe is expelled to heat the water along the bottom of the tank and attain greater efficiency in the circulation of the water. This invention provides a tank 16 with an opening through its bottom 18, and places within the tank a heating chamber 22 with a feeder channel 19. The chamber 22 opens downwardly through the opening in the bottom 18 to receive heat from a suitable source 33 and projects upwardly into the body of water in the tank. The channel 19 is closed against the bottom 18 and extends a suitable distance from the chamber 22 to feed the cooler water thereto. The head 21 and the tubes 27 are provided in the chamber 22 to move evenly and quickly transmit the heat from the chamber 26 to the water passing through the chamber 22. But little space is taken up in the tank 16 by the heater and circulator, and a minimum fuel consumption is effected for maintaining the water at the desired temperature. The device has few parts which may be economically and easily manufactured, and a practical and efficient device is obtained.

It is obvious that the heater with its circulating channel may be placed in any type of tank or enclosure for heating water or other liquid, and that it is not essential to use the particular tank herein described.

It is obvious that various changes in the construction, combination and arrangement of parts could be made which could be used without departing from the spirit of my invention and I do not mean to limit the invention to such details, except as particularly pointed out in the claims:

Having thus described my invention what I claim and desire to secure by Letters Patent of the United States is:—

1. A waterer for stock comprising a tank open at its top adapted to contain water for feeding to stock, a casing mounted on the bottom of the tank below the surface level of the water therein and opening downwardly through the bottom of the tank and having a header compartment in one end and a plurality of open ended water tubes extending through the opposite side walls of the casing, an elongated channel member disposed upon the bottom of the casing and opening at one end into said header compartment of the casing and at its other end into the tank, and a heater disposed beneath the tank in register with the open bottom of the casing for heating water in said tubes to promote circulation through the tank, said channel member to the heater compartment and through the tubes into the body of water in the tank.

2. A water heater for livestock comprising, a rectangular casing, a rectangular tank within said casing to retain a limited amount of water, supporting means mounted in said casing to hold said tank in a raised position and spaced apart from the walls of the casing, a false bottom member connected to said tank to provide a guideway for the water, and heating means enclosed in said casing for heating the water in said false bottom to cause the same to pass therethrough and to circulate within said tank.

3. A water heater for livestock comprising, an elongated casing, and elongated tank within said casing to retain a limited amount of water, supporting means mounted in said casing to hold said tank in a raised position and spaced apart from the walls of the casing, a false bottom member centrally fixed within said tank to provide a long guideway with an opening at one end for admitting the water, the said false bottom member having a dome shaped portion connected with its opposite end, tubes extending through said dome shaped portion and communicating at one end with said false bottom and at the other end with the interior of said tank, and heating means enclosed in said casing for heating the water in said dome shaped portion of the false bottom to cause the same to pass therethrough and to circulate within said tank.

4. A water heater for livestock comprising, a casing, a tank within said casing for holding water, supporting means attached to said casing for holding the tank in a raised position, an elongated guideway mounted upon the bottom of the tank with an open end adjacent one end of the tank, a dome shaped member formed in the bottom of the tank and connected with the opposite end of the elongated guideway, a plurality of tubes mounted in the dome shaped member for passing the water therethrough, and heating means enclosed in the casing for heating the water in the tubes to cause the same to pass therethrough and to circulate within said tank.

5. A device for heating water, comprising a channel member adapted to be placed in the bottom of a water container and having open opposite ends for the circulation of the water in the container therethrough, said channel member having an enlarged water tubular portion to provide increased surface area for the water circulating therethrough, and a heater adapted to be mounted beneath said enlarged tubular portion to heat the water passing therethrough.

6. A device for heating water, comprising a channel member adapted to be placed in the bottom of a water container and having open opposite ends for the circulation of the water in the container therethrough, said channel member having an enlarged water tubular portion to provide increased surface area for the water circulating therethrough, and having a depending portion for mounting through the bottom of the container.

LESLIE T. PETERSEN.